(12) United States Patent
Murabayashi et al.

(10) Patent No.: US 11,112,289 B2
(45) Date of Patent: Sep. 7, 2021

(54) GAS APPLIANCE MONITORING SYSTEM

(71) Applicant: Panasonic Intellectual Property Management Co., Ltd., Osaka (JP)

(72) Inventors: Nobuaki Murabayashi, Osaka (JP); Yoshikuni Tamura, Osaka (JP); Tadanori Shirasawa, Nara (JP); Kazuki Shiota, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 60 days.

(21) Appl. No.: 16/615,800

(22) PCT Filed: Jun. 12, 2018

(86) PCT No.: PCT/JP2018/022307
§ 371 (c)(1),
(2) Date: Nov. 21, 2019

(87) PCT Pub. No.: WO2018/235670
PCT Pub. Date: Dec. 27, 2018

(65) Prior Publication Data
US 2020/0182674 A1    Jun. 11, 2020

(30) Foreign Application Priority Data
Jun. 21, 2017  (JP) .............................. JP2017-121019

(51) Int. Cl.
*G01F 15/06* (2006.01)
*F23K 5/00* (2006.01)
(Continued)

(52) U.S. Cl.
CPC ................ *G01F 15/06* (2013.01); *F23K 5/00* (2013.01); *G01F 3/00* (2013.01); *G01F 15/02* (2013.01)

(58) Field of Classification Search
None
See application file for complete search history.

(56) References Cited

U.S. PATENT DOCUMENTS

| 2010/0188261 A1* | 7/2010 | Fujii | ........................ G01D 4/02 |
| | | | 340/870.02 |
| 2010/0330515 A1* | 12/2010 | Ueki | ....................... F23N 5/242 |
| | | | 431/22 |

FOREIGN PATENT DOCUMENTS

| CN | 101779104 | 7/2010 |
| CN | 105955147 | 9/2016 |

(Continued)

OTHER PUBLICATIONS

Extended European Search Report dated May 14, 2020 in related European Patent Application No. 18819971.5.

(Continued)

*Primary Examiner* — Lisa M Caputo
*Assistant Examiner* — Nigel H Plumb
(74) *Attorney, Agent, or Firm* — Wenderoth, Lind & Ponack, L.L.P.

(57) ABSTRACT

Gas meter and center device are provided. Gas meter includes flow rate measurer that measures a flow rate of gas in time series. Center device receives and analyzes flow rate data from gas meter, and monitors states of use of gas appliances. Gas meter detects the start of operation of gas appliances, and transmits flow rate data during predetermined periods before and after the start of operation in accordance with a request from center device. Center device monitors the states of use of gas appliances based on the received flow rate data.

5 Claims, 4 Drawing Sheets

(51) Int. Cl.
    *G01F 3/00*     (2006.01)
    *G01F 15/02*     (2006.01)

(56) References Cited

FOREIGN PATENT DOCUMENTS

| EP | 2 177 884 | 4/2010 |
|---|---|---|
| JP | 2008-059039 | 3/2008 |

OTHER PUBLICATIONS

International Search Report of PCT application No. PCT/JP2018/022307 dated Aug. 14, 2018.
English Translation of Search Report dated Jul. 22, 2020 in related Chinese Patent Application No. 201880041239.X.

\* cited by examiner

FIG. 3

| ITEM | CONTENT | DETECTION METHOD | CONTENT OF MESSAGE |
|---|---|---|---|
| A | DETECT START OF USE | DISCRIMINATE APPLIANCE | FH STARTED TO BE USED YESTERDAY. NORMAL CHARGE WILL BE DISCOUNTED BY ○○%. |
| B | DETECT THAT APPLIANCE HAS NOT YET BEEN USED | DISCRIMINATE APPLIANCE | FH HAS NOT BEEN USED THIS WINTER. IN THIS SEASON, FH CAN ACHIEVE MORE ECONOMICAL HEATING THAN AIR CONDITIONER. |
| C | DETERMINE FAILURE OF APPLIANCE | DISCRIMINATE APPLIANCE AND MAKE COMPARISON WITH FLOW RATE DATA IN PAST | IS IT MORE DIFFICULT TO IGNITE FH THAN LAST YEAR? INSPECTION/REPLACEMENT OF GAS APPLIANCE IS RECOMMENDED. |
| D | DETERMINE SERVICE LIFE | DISCRIMINATE APPLIANCE AND USE HISTORY IN PAST | OPERATION TIME PERIOD OF FH EXCEEDS ○○ HOURS. REPLACEMENT OF FILTER OR INSPECTION/REPLACEMENT OF APPLIANCE IS RECOMMENDED. |
| E | PREDICT LIFE | DISCRIMINATE APPLIANCE AND MAKE COMPARISON WITH FLOW RATE DATA IN PAST | ABNORMAL FLOW RATE PATTERN HAS BEEN DETECTED. THERE IS POSSIBILITY OF FAILURE IN SEVERAL YEARS. |
| F | PROMOTE REPLACEMENT | DISCRIMINATE APPLIANCE AND SPECIFY MODEL | LATEST GAS FAN HEATER SAVES ENERGY. REPLACEMENT IS ECONOMICAL. |

GAS APPLIANCE MONITORING SYSTEM

TECHNICAL FIELD

The present invention relates to a gas appliance monitoring system that includes a gas meter that measures a flow rate of gas, and a center device that receives measurement data obtained by this gas meter.

BACKGROUND ART

Conventionally, examples of this type of system include a support data providing system that includes: a gas meter that measures a gas consumption amount and accumulates data of the gas consumption amount; a centralized monitoring device that collects the data of the gas consumption amount; and a data collection center device that is connected to the centralized monitoring device via a communication line and analyzes the data of the gas consumption amount, and that performs data analysis by using the data collection center device and provides support data (see, for example, PTL 1).

CITATION LIST

Patent Literature

PTL 1: Unexamined Japanese Patent Publication No. 2008-59039

SUMMARY OF THE INVENTION

However, in a conventional configuration, a gas consumption amount can be collected, and support data can be provided based on this gas consumption amount. The support data is used for a gas dealer to obtain service information, such as advice, proposals, and notices, relating to gas consumption and present the service information to a gas consumer. However, the service information is not directly provided to the gas consumer. In addition, a state of use of an individual gas appliance is not analyzed, and service to be provided is restrictive.

According to the present invention, flow rate data to be transmitted from a gas meter to a center device is limited to flow rate data at a time when a gas appliance starts to be used, and this results in a reduction in an amount of data to be communicated. In addition, the gas appliance is monitored based on a result of analysis performed by the center device, and useful data relating to the gas appliance is provided to a gas consumer.

A gas appliance monitoring system according to the present invention includes a gas meter that includes a flow rate measurer, a storage, and a meter communication unit. The flow rate measurer measures a flow rate of gas in time series. The storage stores, as flow rate data, the flow rate measured by the flow rate measurer. The meter communication unit performs communication with a center device. The gas appliance monitoring system also includes a center device that includes a center communication unit, a data accumulation storage, and an analyzer. The center communication unit performs communication with the gas meter to receive the flow rate data. The data accumulation storage accumulates the received flow rate data. The analyzer analyzes the flow rate data. The gas meter detects the start of operation of a gas appliance, stores flow rate data during predetermined periods before and after the start of operation, and transmits the flow rate data in accordance with a request from the center device. The center device monitors a state of use of the gas appliance based on the flow rate data accumulated in the data accumulation storage.

By employing this configuration, an amount of data to be communicated can be reduced by limiting flow rate data to be transmitted from the gas meter to the center device to flow rate data at a time when the gas appliance starts to be used, the gas appliance can be monitored based on a result of analysis performed by the center device, and useful data relating to the gas appliance can be provided to a gas consumer.

BRIEF DESCRIPTION OF DRAWINGS

FIG. 3 is a diagram explaining the content of analysis performed by an analyzer of the gas appliance monitoring system according to the exemplary embodiment of the present invention and the content of a generated message.

DESCRIPTION OF EMBODIMENT

Exemplary Embodiment

Figure 1:
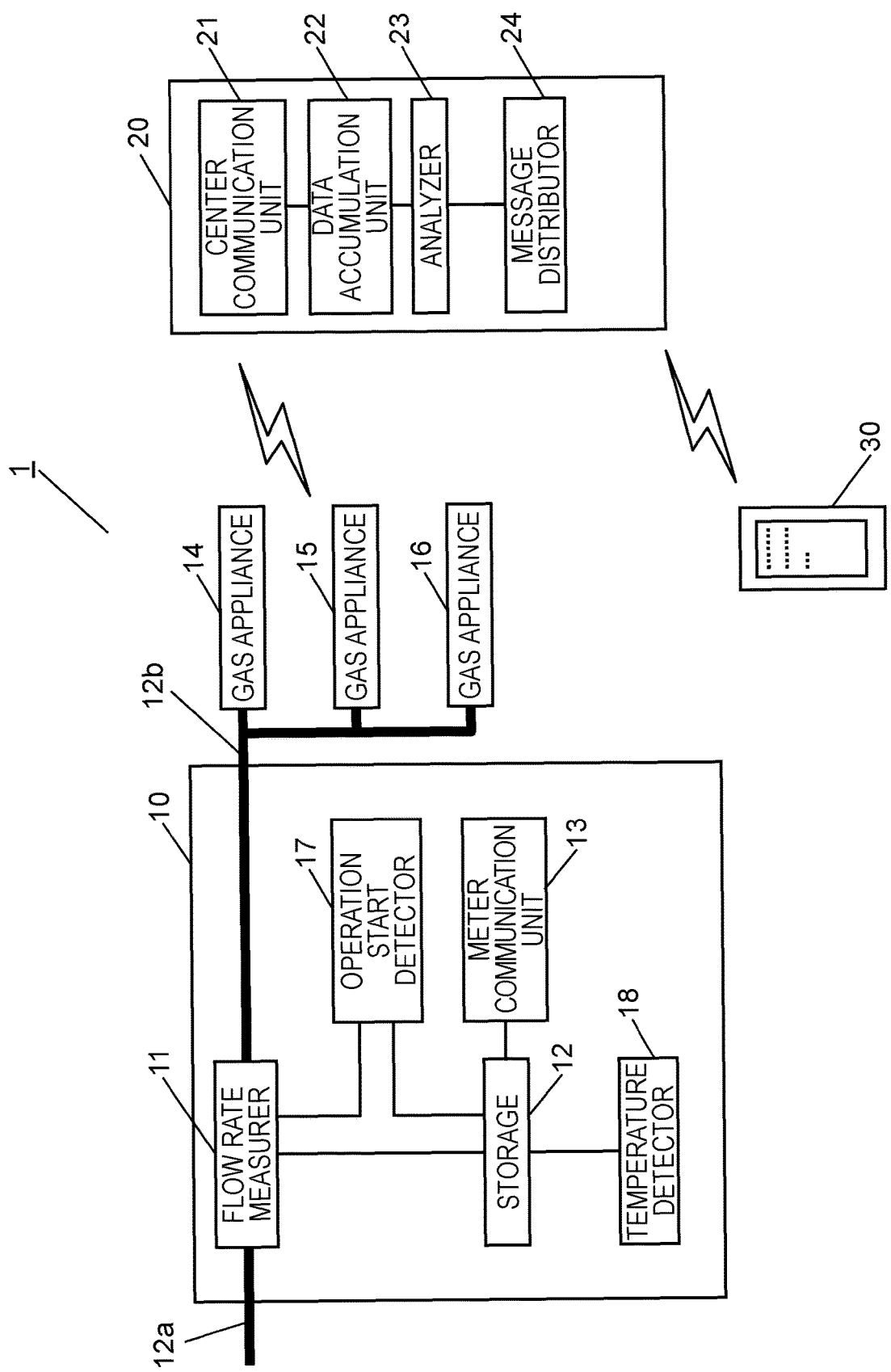
FIG. 1 is a block diagram of a gas appliance monitoring system according to an exemplary embodiment of the present invention.

FIG. 1 is a block diagram of a gas appliance monitoring system according to an exemplary embodiment of the present invention.

In FIG. 1, gas appliance monitoring system 1 includes gas meter 10 that has been installed in a user's residence, and center device 20. Gas meter 10 is installed in a residence of each user, and there is a plurality of gas meters 10. However, in the present exemplary embodiment, description is provided by using only one gas meter 10.

Gas meter 10 includes inflow pipe 12a and outflow pipe 12b of gas, and flow rate measurer 11 is provided on a route from inflow pipe 12a to outflow pipe 12b. In addition, a plurality of gas appliances 14, 15, and 16 is connected on a downstream side of outflow pipe 12b.

Flow rate measurer 11 detects and outputs a flow rate of gas in time series, and measures an instantaneous flow rate at predetermined intervals (for example, every 0.5 seconds). Storage 12 stores flow rate data measured by flow rate measurer 11.

Operation start detector 17 detects that any of gas appliances 14 to 16 has started to operate, by detecting that the flow rate of gas that has been measured by flow rate measurer 11 has increased by a predetermined flow rate (for example, 51.82 L/h), and outputs an operation start signal of the gas appliance.

Storage 12 has a storage capacity of holding the flow rate of gas that has been measured by flow rate measurer 11 as flow rate data during a predetermined time period. Storage 12 successively performs storage, and if the storage capacity is exceeded, storage 12 sequentially overwrites the flow rate data to store most recent flow rate data. Storage 12 uses, as a starting point, a point in time at which the operation start signal has been output from operation start detector 17, and holds flow rate data in the past within a predetermined period before the starting point, and flow rate data measured during a predetermined period after the starting point.

Storage 12 can also store temperature data of ambient temperature or gas that has been detected by temperature detector 18, or pressure data that has been detected by a not-illustrated pressure detector.

In addition, center device 20 includes center communication unit 21 that performs communication with meter communication unit 13 of gas meter 10, and data accumulation unit 22 that accumulates received flow rate data, the temperature data, or the pressure data. Center device 20 also includes analyzer 23 that performs analysis by using the flow rate data accumulated in data accumulation unit 22, and message distributor 24 that generates a message addressed to a user based on a result of analysis performed by analyzer 23 and distributes the message to terminal 30, such as a smartphone or a personal computer, that is possessed by the user. Terminal 30 may be a display terminal installed in the user's residence. Further, a distribution method is not particularly limited, and may be a wireless method, a wired method, a report indicating a meter-reading result, or the like.

Figure 2:
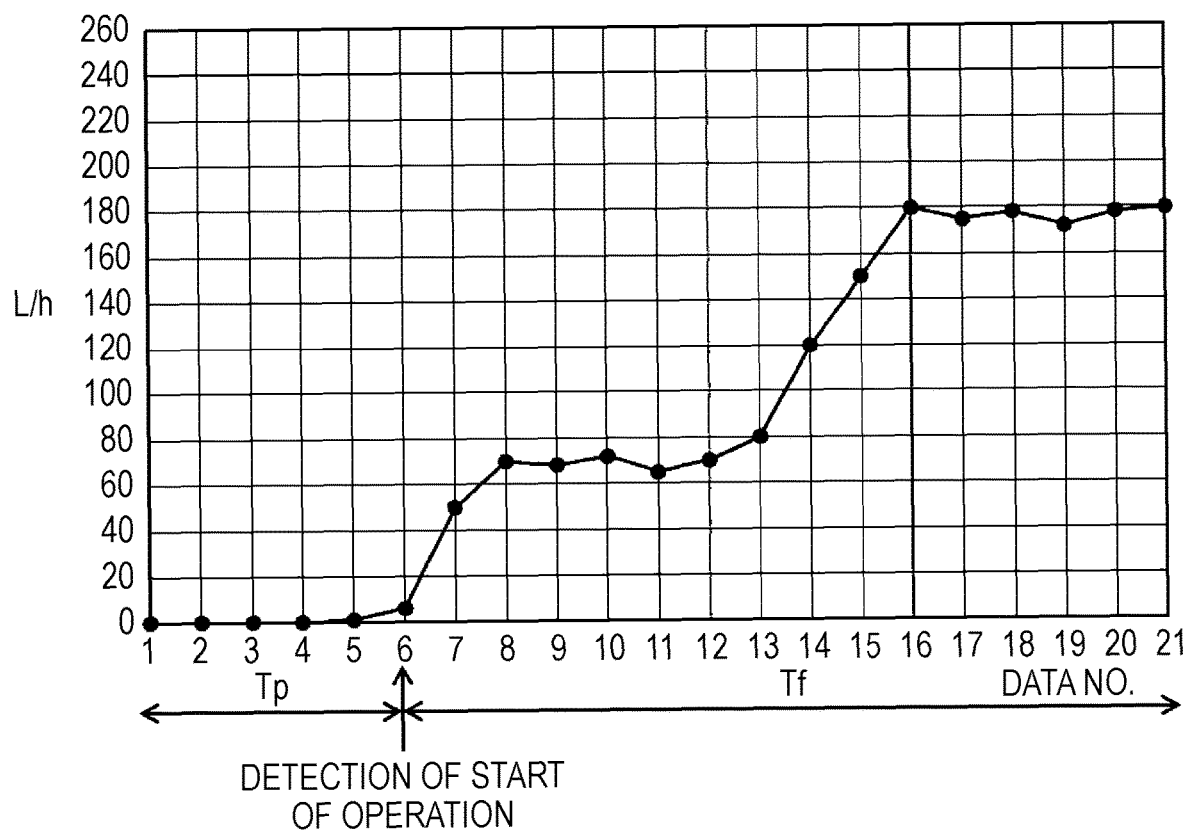
FIG. 2 is a graph for explaining an operation of the gas appliance monitoring system according to the exemplary embodiment of the present invention.
Figure 4:
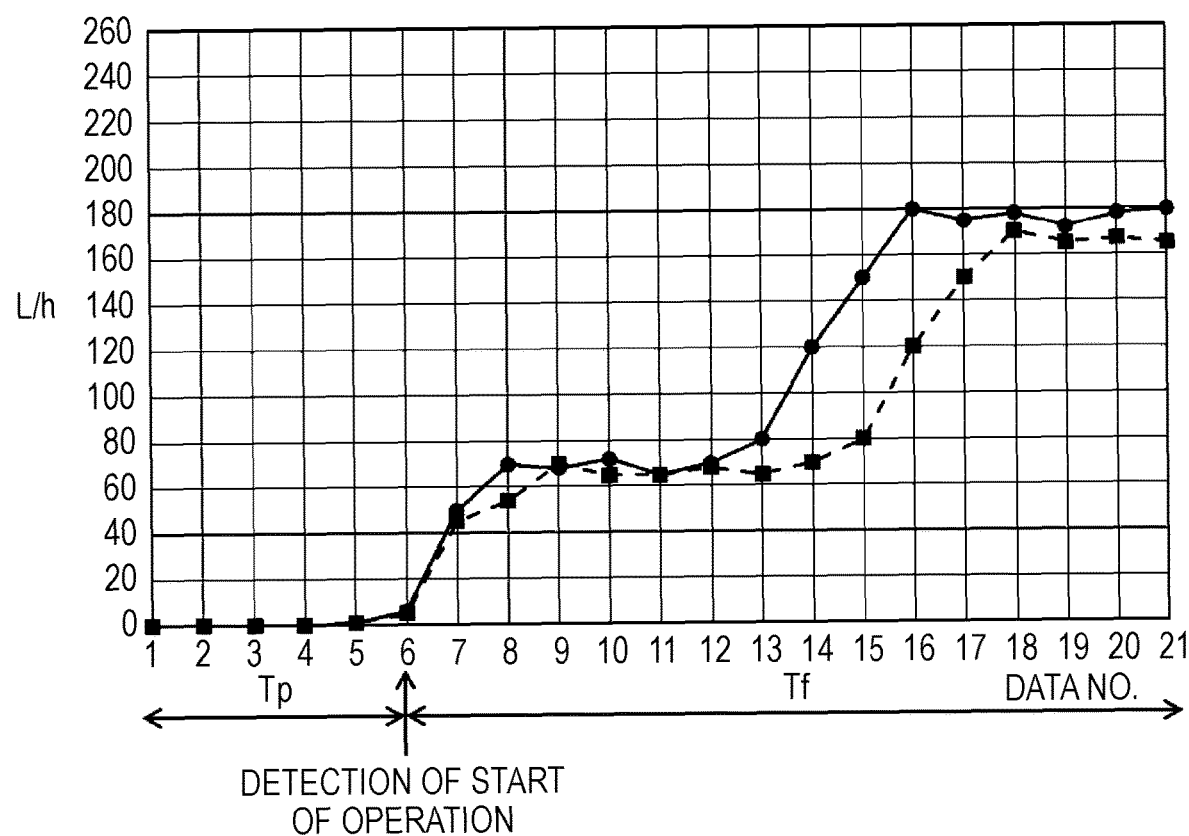
FIG. 4 is a graph for explaining an operation of the gas appliance monitoring system according to the exemplary embodiment of the present invention.

FIG. 2 is a graph illustrating an example of a measurement timing of flow rate measurer 11 and measured flow rate data in a case where a gas appliance is a gas fan heater. FIG. 2 illustrates a relationship between a timing of outputting an operation start signal from operation start detector 17 and flow rate data stored in storage 12. A black circle indicates flow rate data measured by flow rate measurer 11 every 0.5 seconds.

In the present exemplary embodiment, a point in time (Data No. 6) at which the operation start signal is output is used as a starting point, and 5 pieces of flow rate data (Data Nos. 1 to 5) that have been measured during predetermined period Tp before the starting point and 16 pieces of flow rate data (Data Nos. 6 to 21) that have been measured during predetermined period Tf after the starting point are stored and held in storage 12.

Then, after meter communication unit 13 receives, from center device 20, a request signal for flow rate data, from among pieces of flow rate data that have been stored in storage 12, pieces of flow rate data (Data Nos. 1 to 21) that correspond to predetermined periods Tp and Tf are transmitted to the center device. The flow rate data is transmitted in a state where a serial number of gas meter 10, date and time of measurement, and the like are included as additional data.

Next, analyzer 23 discriminates an appliance that has started to operate based on a pattern of a change in flow rate data at the time of the start of operation that has been received from gas meter 10. For example, as a typical flow rate pattern at a time when a gas fan heater starts to operate, as illustrated in FIG. 2, slow ignition appears by which a flow rate temporarily becomes almost constant in the middle of arrival at a maximum flow rate. Therefore, by detecting this slow ignition, a gas appliance that has started to operate is determined to be a gas fan heater. In the discrimination of an appliance, the consideration of temperature data and pressure data enables an accuracy of discrimination to be improved. Then, a discrimination result is stored together with the serial number of gas meter 10 and date and time of the start of operation in data accumulation unit 22.

Basically, one gas meter 10 is installed in each residence, and therefore the serial number of gas meter 10 can be used to identify a user. Accordingly, by storing an analysis result in combination with the serial number of gas meter 10, a gas appliance installed in a residence of an individual user can be grasped. In addition, by registering a user's email address or the like in association with the serial number of gas meter 10, a message can be distributed to terminal 30 of the user from message distributor 24.

The content of analysis performed by analyzer 23 and the content of a message generated by message distributor 24 are described below with reference to FIG. 3.

Item A indicates that it is detected that a specified gas appliance such as a heater has started to be used in a season and a message that corresponds to detection is distributed. In a case where it has been determined in the discrimination of an appliance described above that a gas fan heater (FH) has been used for the first time in autumn and winter, the message "FH started to be used yesterday. Normal charge will be discounted by ○○%." is distributed in order to promote the use of gas.

Item B indicates that it is detected that a gas fan heater has not been used although winter has come and a message that corresponds to detection is distributed. In order to promote the use of gas, the message "FH has not been used this winter. In this season, FH can achieve more economical heating than air conditioner." is distributed.

Item C indicates that the failure or deterioration of a gas appliance is detected and a message that corresponds to detection is distributed. For example, a change in a flow rate (a dotted line) after the current start of operation of the same gas fan heater is compared with a change in a flow rate of last year (a solid line) that has been stored in data accumulation unit 22. By doing this, it is determined from a difference such as an extended time period of slow ignition or a reduction in a maximum flow rate that there is a possibility of the occurrence of some kind of abnormality in the gas fan heater, and the message "Is it more difficult to ignite FH than last year. Inspection/replacement of gas appliance is recommended." is distributed in order to attract attention of a user.

Item D indicates that a time period or years of use of a gas appliance are detected and a message that corresponds to detection is distributed. An accumulated time period of use is calculated by integrating both a time period of operation of the same gas fan heater and a time period of use in the past that has been stored in data accumulation unit 22. In a case where the gas fan heater has been used during a predetermined time period, in a case where years after the gas fan heater has started to be used for the first time exceed service life, or in other cases, the message "Operation time period of FH exceeds 00 hours. Replacement of filter or inspection/replacement of appliance is recommended." is distributed in order to attract attention of a user. Item E indicates that the failure of a gas appliance is predicted and a message that corresponds to detection is distributed. By analyzing flow rate data stored in data accumulation unit 22 in detail, a deterioration state and a change over time of the gas appliance are determined, and a future risk of a failure is reported in advance. For example, the message "Abnormal flow rate pattern has been detected. There is possibility of failure in several years." is distributed in order to attract attention of a user.

Item F indicates the promotion of replacement. A model of a gas appliance is specified in the discrimination of an appliance, and in a case where the gas appliance is an old model, a latest model is recommended. For example, the message "Latest gas fan heater saves energy. Replacement is economical." is distributed.

As described above, according to the present exemplary embodiment, flow rate data or the like that has been received from gas meter 10 can be analyzed by using center device 20, various messages relating to the use of a gas appliance can be generated, and the various messages can be distributed as useful information to a user.

The exemplary embodiment of the present invention has been described above. The description above of the exemplary embodiment exemplifies the present invention, and does not restrict the present invention. In addition, exemplary embodiments can also be achieved in which respective components described in the exemplary embodiment above are appropriately combined. Modifications, replacements, additions, omission, and the like can be made to the present invention without departing from the scope of the claims or equivalents of the claims.

As described above, a gas appliance monitoring system in first disclosure includes a gas meter including a flow rate measurer, a storage, and a meter communication unit. The flow rate measurer measures a flow rate of gas in time series. The storage stores, as flow rate data, the flow rate measured by the flow rate measurer. The meter communication unit performs communication with a center device. This gas appliance monitoring system also includes the center device including a center communication unit, a data accumulation storage, and an analyzer. The center communication unit performs communication with the gas meter to receive the flow rate data. The data accumulation storage accumulates the received flow rate data. The analyzer analyzes the flow rate data. Further, the gas meter detects the start of operation of a gas appliance, stores flow rate data during predetermined periods before and after the start of operation, and transmits the flow rate data in accordance with a request from the center device. The center device monitors a state of use of the gas appliance based on the flow rate data accumulated in the data accumulation storage.

By employing this configuration, an amount of data to be communicated can be reduced by limiting flow rate data to be transmitted from the gas meter to the center device to flow rate data at a time when the gas appliance starts to be used, and the gas appliance can be monitored based on a result of analysis performed by the center device.

A gas appliance monitoring system in second disclosure may have a configuration in which, in particular, in the first disclosure, the center device includes a message distributor, and the center device analyzes the flow rate data that has been accumulated in the data accumulation storage, by using the analyzer, and generates a predetermined message based on analysis performed by the analyzer and distributes the predetermined message to a specified distribution destination, by using the message distributor.

By employing this configuration, a useful message relating to the gas appliance can be provided to a gas consumer.

A gas appliance monitoring system in third disclosure may have a configuration in which, in particular, in the second disclosure, the analyzer determines the state of the use of the gas appliance, and the message distributor generates and distributes a message relating to the specified gas appliance.

INDUSTRIAL APPLICABILITY

As described above, a gas appliance monitoring system according to the present invention enables various types of analysis to be performed by using flow rate data measured by a gas meter. Therefore, the gas appliance monitoring system according to the present invention is not only applicable to a gas meter for household use, but is also applicable to a gas meter for business use.

REFERENCE MARKS IN THE DRAWINGS 1 gas appliance monitoring system
10 gas meter
11 flow rate measurer
12 storage
13 meter communication unit
20 center device
21 center communication unit
22 data accumulation unit
23 analyzer
24 message distributor

The invention claimed is:

1. A gas appliance monitoring system comprising:
a gas meter including a flow rate measurer, a storage, and a meter communication unit; and
a center device including a center communication unit, a data accumulation storage, and an analyzer,
wherein the flow rate measurer measures a flow rate of gas in time series,
the storage stores, as flow rate data, the flow rate measured by the flow rate measurer,
the meter communication unit performs communication with the center device,
the center communication unit performs communication with the gas meter to receive the flow rate data,
the data accumulation storage accumulates the flow rate data that has been received,
the analyzer analyzes the flow rate data,
the gas meter detects a start of operation of a gas appliance, stores the flow rate data in the storage during (i) a first predetermined amount of time before the start of operation of the gas appliance and (ii) a second predetermined amount of time after the start of operation of the gas appliance, and transmits the flow rate data stored in the storage to the center device in response to a request from the center device, and
the center device monitors a state of use of the gas appliance based on the flow rate data that has been accumulated in the data accumulation storage.

2. The gas appliance monitoring system according to claim 1, wherein
the center device includes a message distributor, and
the center device analyzes the flow rate data that has been accumulated in the data accumulation storage, by using the analyzer, and generates a predetermined message based on analysis performed by the analyzer and distributes the predetermined message to a specified distribution destination, by using the message distributor.

3. The gas appliance monitoring system according to claim 2, wherein
the analyzer determines the state of the use of the gas appliance, and
the message distributor generates and distributes the predetermined message relating to the gas appliance that has been specified.

4. A gas appliance monitoring system comprising:
a gas meter including a flow rate measurer, a storage, and a meter communication unit, the flow rate measurer measuring a flow rate of gas in time series, the storage storing, as flow rate data, the flow rate measured by the flow rate measurer, the meter communication unit performing communication with a center device; and the center device including a center communication unit, a data accumulation storage, an analyzer, and a message distributor, the center communication unit performing communication with the gas meter to receive the flow rate data, the data accumulation storage accumulating the flow rate data that has been received, the analyzer analyzing the flow rate data, the message distributor generating a message and distributing the message, wherein the gas meter detects start of operation of a gas appliance, stores the flow rate data during predetermined periods before and after the start of operation, and transmits the flow rate data based on a request from the center device, and the center device monitors a state of use of the gas appliance based on the flow rate data that has been accumulated in the data accumulation storage, and distributes the message relating to the gas appliance to a terminal of a user of the gas appliance from the message distributor.

5. The gas appliance monitoring system according to claim 4, wherein the message includes at least one of detection of a start of use of the gas appliance, detection that the gas appliance has not yet been used, detection of a failure of the gas appliance, detection of a time period or years of use of the gas appliance, detection of a predicted life of the gas appliance, and promotion of replacement of the gas appliance.

* * * * *